(12) United States Patent
Ignagni

(10) Patent No.: US 6,553,322 B1
(45) Date of Patent: Apr. 22, 2003

(54) APPARATUS AND METHOD FOR ACCURATE PIPELINE SURVEYING

(75) Inventor: Mario B. Ignagni, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/407,415

(22) Filed: Sep. 29, 1999

(51) Int. Cl.$^7$ .................. G01C 23/00; G01C 25/00; G01C 22/00; F16L 55/48
(52) U.S. Cl. .................. 702/34; 73/865.8; 701/35; 701/214; 701/221; 702/36; 702/94
(58) Field of Search .................. 702/34, 36, 94, 702/150, 158; 701/35, 213, 214, 220, 221; 73/865.8, 861.5

(56) References Cited

U.S. PATENT DOCUMENTS

| | | | | |
|---|---|---|---|---|
| 4,717,875 A | * | 1/1988 | Lara | 324/247 X |
| 4,783,742 A | * | 11/1988 | Peters | 73/510 X |
| 4,799,391 A | * | 1/1989 | Lars | 73/865.8 |
| 4,833,787 A | * | 5/1989 | Van Steenwyk | 33/302 |
| 4,909,091 A | * | 3/1990 | Ellmann et al. | 73/865.8 X |
| 4,945,775 A | * | 8/1990 | Adams et al. | 73/865.8 |
| 4,987,684 A | * | 1/1991 | Andreas et al. | 33/304 |
| 5,331,578 A | * | 7/1994 | Stieler | 73/865.8 X |
| 5,385,045 A | * | 1/1995 | Hunt et al. | 73/866.5 X |
| 5,864,232 A | * | 1/1999 | Laursen | 324/220 |
| 6,023,986 A | * | 2/2000 | Smith et al. | 73/866.5 |
| 6,170,344 B1 | * | 1/2001 | Ignagni | 73/865.8 |
| 6,243,657 B1 | * | 6/2001 | Tuck et al. | |

FOREIGN PATENT DOCUMENTS

| | | | | |
|---|---|---|---|---|
| GB | 2086055 A | * | 5/1982 | 33/304 |
| GB | 2130721 A | * | 6/1984 | G01C/21/16 |
| JP | 8-233564 | * | 9/1996 | G01B/17/00 |
| WO | WO 85/05652 | * | 12/1985 | E21B/47/024 |

* cited by examiner

Primary Examiner—Thomas P. Noland
(74) Attorney, Agent, or Firm—McDonnell Boehnen Hulbert & Berghoff

(57) ABSTRACT

A pipeline surveying system including a pipeline pig can accurately provide a pipeline profile after correlation with a previously determine Global Positioning System (GPS) survey. An inertial measurement unit located in the pig determines a pipeline profile as it travels through the pipeline and correlates the measured profile with the GPS survey.

20 Claims, 5 Drawing Sheets

SCHEME FOR AIDING THE NAVIGATION SOLUTION USING DISTINCTIVE PIPELINE FEATURES

AIRBORNE PIPELINE PROFILE MAPPING
USING GLOBAL POSITIONING SYSTEM

DEFINITION OF POSITION ERRORS PARAMETERS USED IN PIPELINE DISTINCTIVE-FEATURE CORRELATION

APPARATUS AND METHOD FOR ACCURATE PIPELINE SURVEYING

BACKGROUND OF THE INVENTION

A need arises in pipeline inspection applications to accurately determine the position of a mobile PIG (pipeline inspection unit) at all points along the course of a pipeline network. The position data allows pipeline features to be accurately located and catalogued, as well as allowing existing faults to be precisely pinpointed for maintenance purposes. The accurate pipeline position information is also useful when compared to similar data taken at an earlier time, and provides the means of identifying unusual pipeline distortions which are developing that may require remedial maintenance action.

The use of an inertial navigation system in a pipeline surveying application has the potential to significantly enhance the accuracy of the position data. However, due to the inherent error propagation characteristics of inertial navigation systems, it is necessary to provide periodic resets to maintain the position error at a level acceptable for the desired survey accuracy. This may be accomplished by the traditional method of utilizing a series of points on the pipeline having precisely known positions which may be used to update the inertial navigation system. This generally requires that time of passage of the PIG relative to a known reference point be made observable by a secondary means, such as by the detection of an electromagnetic signal. Still another method would use the inspection data to identify specific features, such as valves, that have known positions and which may be used as a source of precise position information suitable for aiding the inertial navigation solution. These two methods are somewhat limiting for a number of reasons. In the first method, a sufficient number of points must be established that allows position fixes at a rate which maintains the inertial navigation errors at an acceptably low level. Since each reference point must be surveyed, using GPS for example, a fairly high cost is associated with the survey of the reference points. In the second method, the distribution of the known pipeline features may be inadequate to provide the position fix frequency required for the desired survey accuracy.

Another approach, which is the basis of the present invention, establishes a series of position fixes by first continuously mapping the pipeline profile using GPS, and then identifying distinctive features, such as bends, that may be sensed by the inertial navigation system to provide a sequence of natural position fix opportunities. In general, pipelines have many such features prominent enough to be used for obtaining position fixes, so the fix frequency will be sufficient to allow the inertial navigation solution accuracy to be maintained at the desired level. Furthermore, obtaining the pipeline profile map using GPS is generally possible using conventional airborne surveying techniques, thereby providing a very efficient and economical approach to pipeline surveying. The use of ground-penetrating radar will allow even buried pipelines to be precisely surveyed. For marine pipelines, doppler sonar is the natural means by which a pipeline profile may be continuously mapped over its entire length.

SUMMARY OF THE INVENTION

An inertial navigation system on board the PIG traveling through the pipeline is used to continuously compute the geographic position of the PIG. Periodic position fixes becomes available through the dynamics sensed by the inertial navigation system that are correlated to a high degree with a series of pipeline distinctive features having precisely known locations, these features having been established by a GPS survey of the pipeline profile. The position fixes allow the inertial navigation system to be updated using a Kalman Filter, thus providing the highest accuracy possible in defining the 3-dimensional position of pipeline features and faults. The approach may be implemented either in real time, or off-line using stored inertial sensor, odometer, and GPS survey data. These elements are all combined in a unique manner to achieve highly accurate PIG position at all points along the course of a pipeline.

DETAILED DESCRIPTION OF THE PRESENT INVENTION

Figure 1:
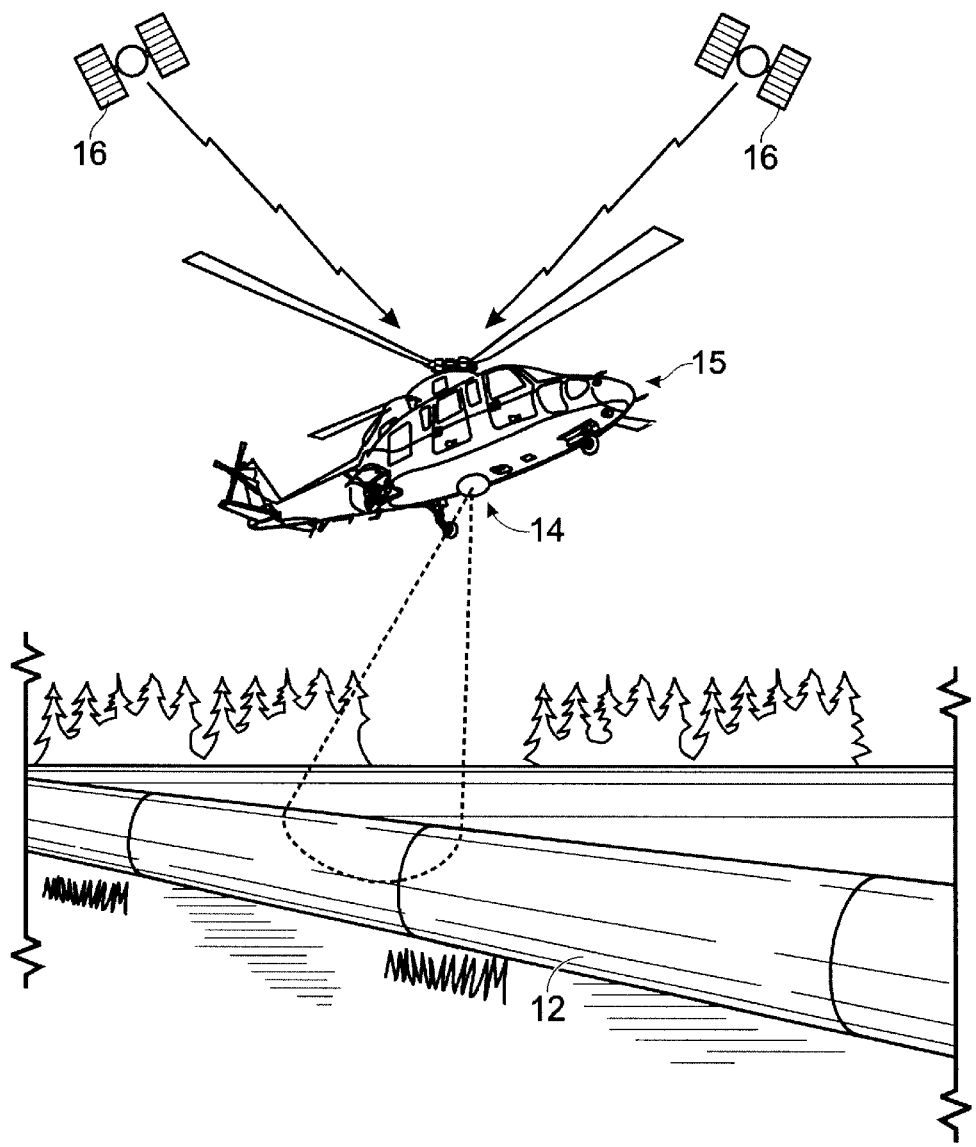
FIG. 1 shows a system of GPS satellites together with radar on board a helicopter to map out the profile of a pipeline.
Figure 2:
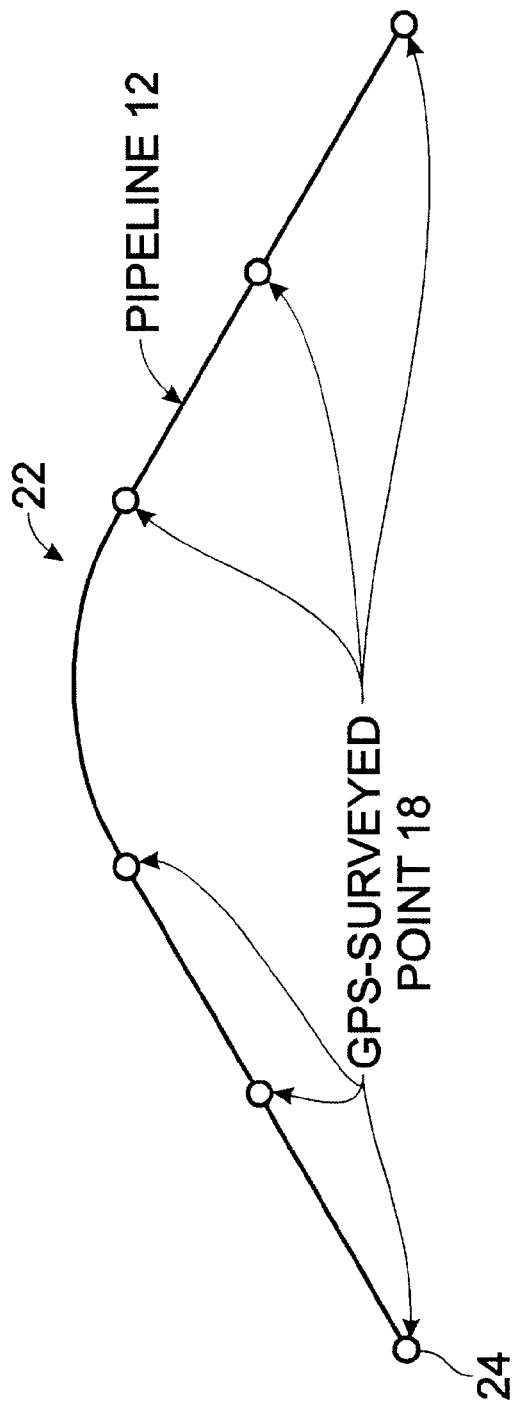
FIG. 2 shows a pipeline segment defined by GPS-surveyed points.
Figure 3:
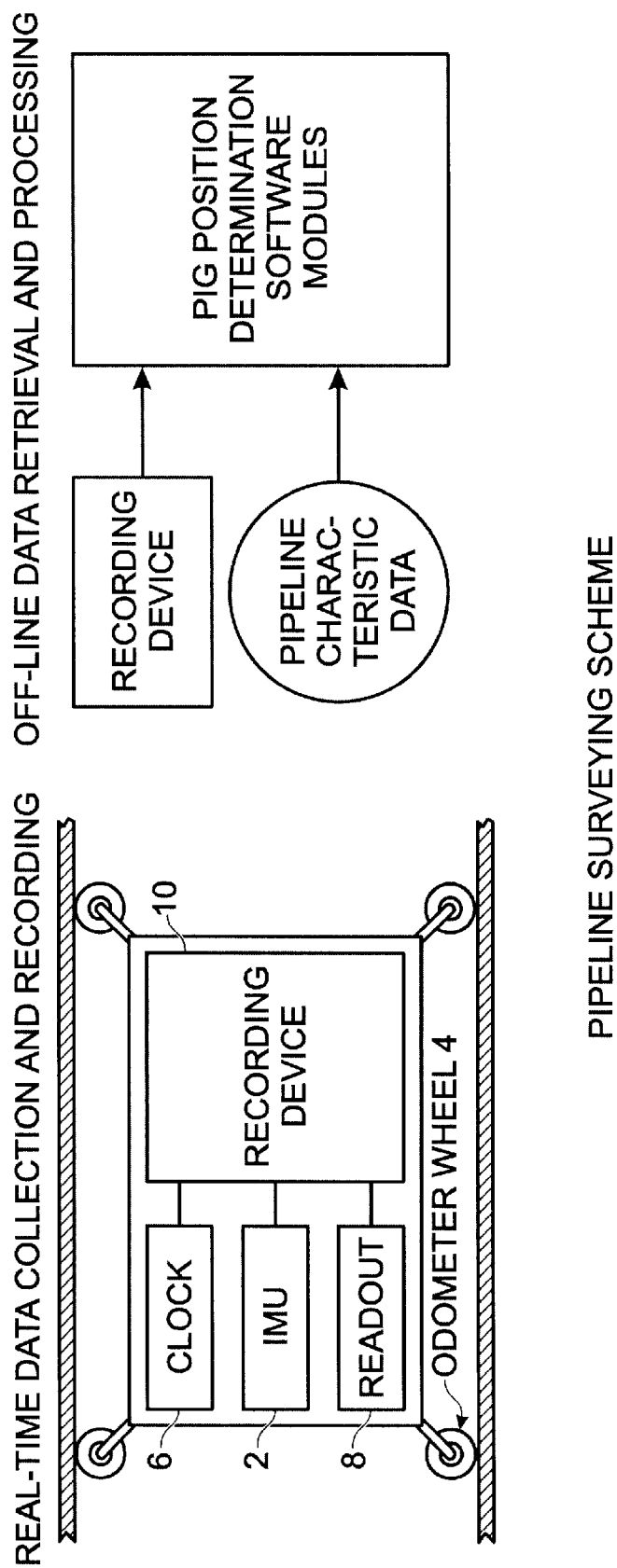
FIG. 3 shows the pipeline surveying system of the present invention.

The operation of the system 1 takes place in two phases. FIG. 1 shows the first phase which defines the pipeline 12 profile, potentially in both horizontal and vertical planes, using a ground penetrating radar 14 from an aircraft 15, together with differential GPS techniques in satellites 16 to precisely establish the coordinates of all points along the course of the pipeline 12. From this, a series of distinctive pipeline features are identified and defined by their GPS-derived position coordinates (latitude, longitude, altitude), from which a set of profile parameters (curvature, heading, etc.) are derived as functions of the distance traveled from the start of the segment. This is illustrated in FIG. 2. The second phase is carried out as the PIG 1 traverses the pipeline network 12. The elements on-board the PIG 1, as shown FIG. 3, are:

An Inertial Measurement Unit (IMU) 2 consisting of a triad of gyros, a triad of accelerometers, and a digital processor that compensates the sensor outputs, and converts them into a form suitable for storage An odometer 4 that measures the incremental distance traveled by the PIG along the course of the pipeline over successive intervals of time and a readout 8 tracks the output of the odometer 4.

A clock 6 which provides accurate absolute time to be used in the subsequent data processing phase as the means of synchronizing all of the recorded data.

A recording device 10 that allows the IMU, odometer, and clock outputs to be recorded at a rate sufficient for the needs of the subsequent data processing phase. During this time, data from the inertial measurement unit 2 and the odometer 4 are used to establish a correlation with respect to each successive pipeline feature 18 as the PIG 1 approaches the feature 18, and then recedes from it. The correlation process establishes the error in the PIG position at each of the points 18, and allows the navigational solution to be optimally reset using a Kalman Filter 32.

A segment 22 on the order of 100 feet in length that is distinct, insofar as it undergoes a relatively large heading or pitch change (3 to 5 degrees), may be used. The curvature of the segment 22, as a function of the distance from the start of the segment 24, represents a convenient function that characterizes that particular segment 22. If, further, the distinctive pipeline segment 22 is defined via a finite number of GPS-derived latitude/longitude pairs, the location of the pipeline segment 22 is known in an absolute geographic sense as well. Therefore, if the curvature of the pipeline is measured at a later time by an IMU 2 traveling through the pipeline 12 on a mobile unit (PIG) 1, the means exists to infer the positions of the mobile unit 1 at a discrete number of points 18 along the pipeline 12 by correlating the two curvature functions.

Figure 4:
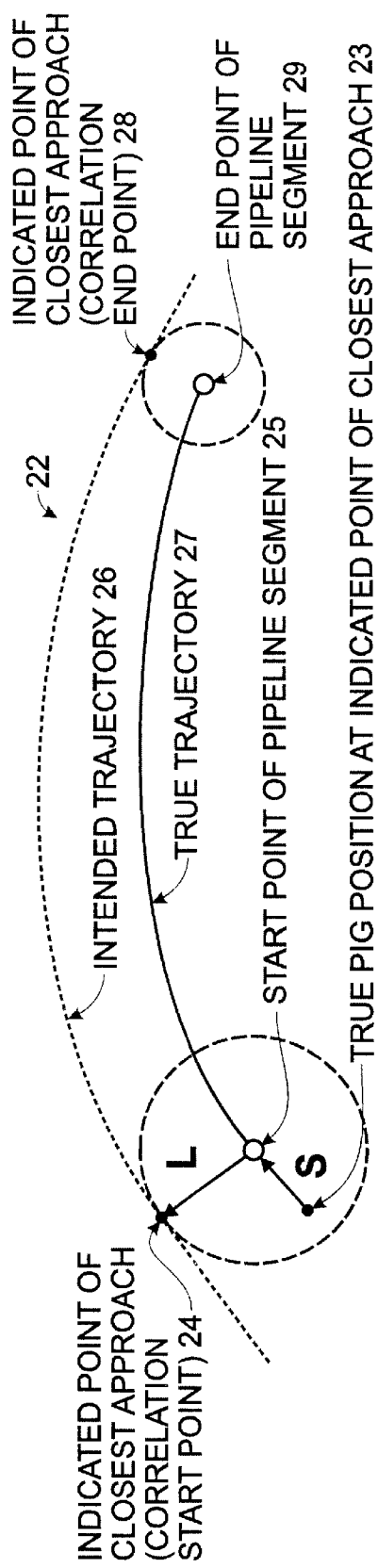
FIG. 4 shows a PIG traveling through a pipeline segment and correlating its data with the GPS-surveyed data.

FIG. 4 shows the pipeline correlation process used in the present invention. The known curvature functions associated with discrete pipeline segments 22, together with the same functions are determined directly from the inertial navigation system 1. The inertially-derived position 23 is used to enable the correlation process when the indicated PIG position 25 has a minimum distance from the starting point 24 of the distinctive pipeline segment 22. The correlation process establishes the correlation between the measured curvature 27 and the data-base curvature 26, each as a function of distance traveled. The correlation process continues until the indicated PIG position 29 has a minimum distance relative to the final point 28 of the pipeline segment 22. The correlation process will clearly define how the indicated position 23 of the PIG needs to be adjusted so that the two curvature functions 26, 27 have a maximum correlation. This, in turn, provides a PIG position fix that can be processed through a Kalman Filter 32 to correct the inertial solution so that optimally accurate attitude, velocity and position are provided. This process continues throughout the survey as each distinctive pipeline segment 22 is encountered.

A number of techniques to establish the pipeline data base are as follows:

(1) A detailed surveyor's map (made at the time the pipeline 12 is laid) may be used to define the locations of distinctive pipeline segments 22. A differential GPS survey of these distinct segments 22 may then be carried out, using a magnetic detector to locate the pipeline 12 in each region of interest.

(2) A preliminary run of the PIG 1 through the pipeline 12 may be used to identify distinctive segments 22 by means of heading change or curvature, with the approximate location of the distinctive features being determined by the navigation information generated during the preliminary run. A differential GPS survey may then be carried out in the region of each distinctive point 18, with a magnetic detector being used to locate the pipeline 12.

(3) Airborne radar mapping of the pipeline 12 (plan and vertical profile), from a helicopter 15 flying along the course of the pipeline 12, may be used to locate distinctive pipeline features. The helicopter position is established by differential GPS, and time correlated with the sequence of radar images to allow the precise location of distinctive pipeline features to be determined. Ground penetrating radar 14 can be used to identify both above-ground and below-ground segments of the pipeline 12, and can map the pipeline profile in both the horizontal and vertical planes.

(4) For undersea pipelines, the mapping of the pipeline may be achieved using a mapping sonar on-board a surface vessel. The use of differential GPS may be used to establish the position of the surface vessel at all times, which can be time-correlated with the sequence of sonar images to allow the location of distinctive pipeline features to be obtained.

FIG. 1 illustrates a pipeline profile mapping operation using a GPS (Global Positioning System) through satellites 16, together with a ground-penetrating radar 14 on-board a helicopter 15 traversing an underground pipeline 12. The precise GPS-derived position information is used to establish position coordinates (north, east, down) at all points 18 along the length of the pipeline 12, as defined by a series of radar images of the pipeline 12 occurring simultaneously with the series of GPS-derived positions. In general, to enhance the accuracy of the GPS-derived positions, differential GPS would normally be utilized. This allows position accuracies on the order of a centimeter. Inherent in the concept is the assumption that the helicopter flight path is controlled in real time to stay approximately centered over the pipeline 12 based on the radar image that is being registered by the ground-penetrating radar 14. The analogous situation for a marine pipeline would utilize sonar signals emitted by a surface craft which is receiving differential GPS signals on a continuous basis to precisely identify the positions associated with a series of sonar images of the submerged pipeline.

FIG. 2 depicts a segment 22 of a pipeline with a heading change illustrating a distinctive pipeline feature. The segment 22 is of sufficient magnitude to allow it to be used for subsequent identification by an IMU 2. The curvature of the segment 22, as a function of the distance from the start of the segment 24, will represent a function that characterizes that particular segment 22. As stated above, the distinctive pipeline segment 22 is defined via a finite number of GPS derived positions 18, and the location of the pipeline segment 22 is known in a geographic sense. Therefore, when the curvature of the pipeline 12 is measured at a later time by an IMU 2 traveling through the pipeline 12 on a mobile unit 1 (PIG), the means exist to indicate the positions of the mobile unit 1 at a discrete number of points 18 along the pipeline 12 by correlating the two functions.

Figure 5:
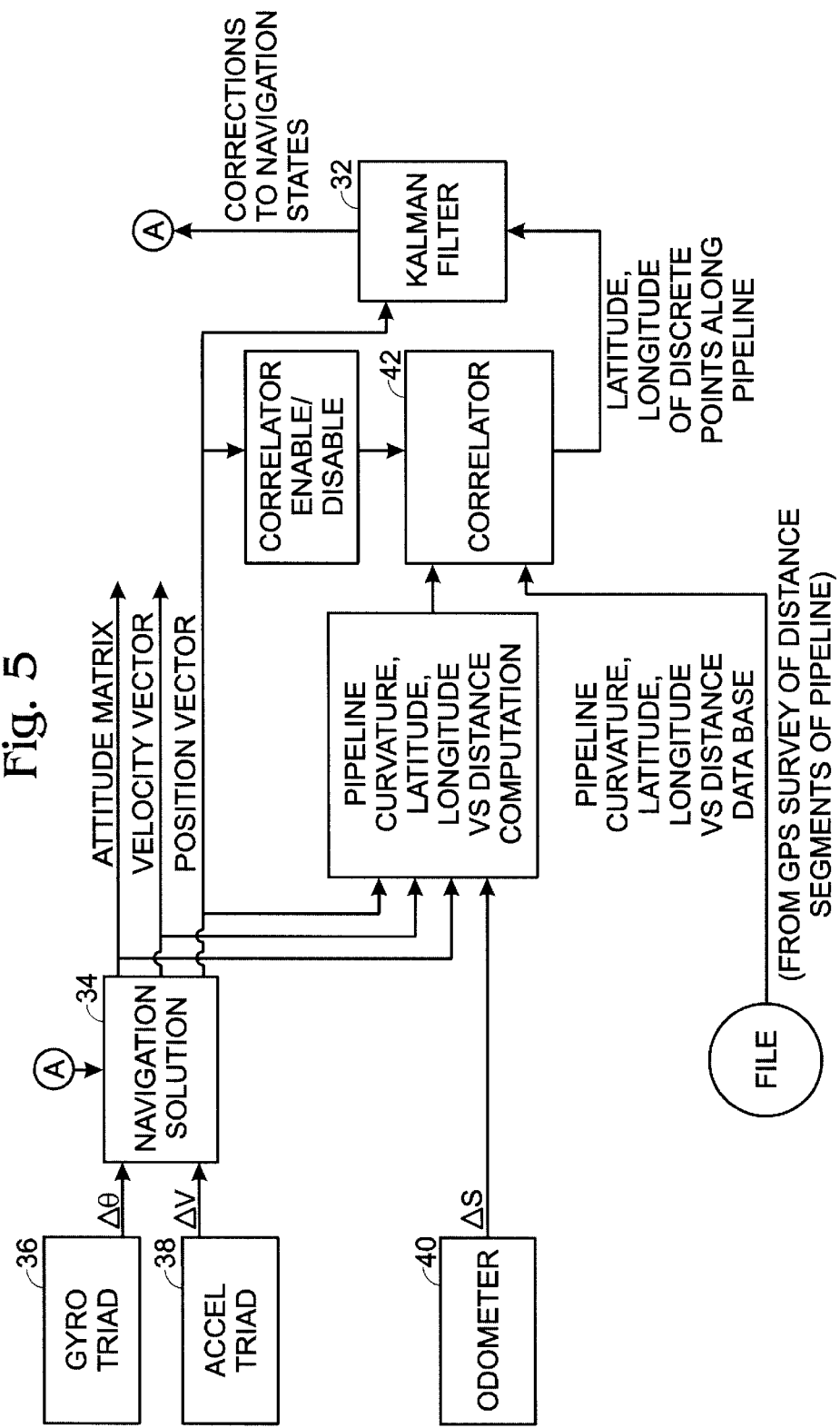
FIG. 5 shows a block diagram of the processing performed in the pipeline surveying system.

FIG. 5 illustrates the PIG navigation system 1 using an inertial navigation solution 34 and known curvature functions associated with discrete pipeline segments 22 determined previously. An inertial navigation solution 34 is generated by processing the gyro 36 and accelerometer 38 outputs to arrive at a best estimate of position. The PIG latitude, longitude and altitude, together with the pipeline curvature, are computed as a function of odometer-derived distance traveled along the pipeline 12. When the indicated PIG position has reached the point of closest approach to the starting point 24 of a distinctive pipeline segment 22, a correlation process begins that utilizes the position and curvature derived by both the navigation system and the GPS-derived pipeline map. The correlation process continues until the indicated PIG position is beyond the position of the pipeline segment 22 by some fixed distance. The correlation process defines how the indicated position of the PIG 1 needs to be adjusted so that the two curvature functions have a maximum correlation. This correction in the inertial navigation system position coordinates is then utilized in the Kalman Filter 32 to reset the navigation solution 34. This process continues throughout the survey as each distinctive pipeline segment 22 is encountered. The preferred embodiment of the invention consists of both a hardware implementation and an information processing concept.

The hardware implementation of the concept consists of the following elements:

An Inertial Measurement Unit 2 (IMU) consisting of a triad of gyros 36, a triad of accelerometers 38, and a digital processor that compensates the sensor outputs, and converts them into a form suitable for processing by the navigation computer, or to be stored for later post-processing.

An odometer 40 that measures the incremental distance traveled by the PIG 1 along the course of the pipeline 12

The present invention can perform its operation with everything on board the PIG 1. However, the present invention has the option of off-line processing. In the event that off-line processing is to be carried out, the following additional elements are required.

A clock 6 which provides accurate absolute time to be used in the subsequent data processing phase as the means of synchronizing all of the measurements.

A recording device 10 that allows the IMU 2, odometer 4, and clock 6 outputs to be recorded at a rate sufficient for the needs of the subsequent data-processing phase. The information processing concept used to derive precision PIG position at all points 18 along the course of the pipeline 12 network uses the outputs of the IMU 2 and odometer 4 systems recorded during the real-time phase of the pipeline survey, in combination with the reference-point positions derived from the GPS measurements obtained during the pipeline survey. The data processing consists of three major parts, as follows:

Inertial Navigation Solution 34—The IMU gyro 36 and accelerometer 38 data are integrated to provide a navigation solution 34 in the North/East/Down frame consisting of an attitude matrix and 3-dimensional velocity and position vectors. Each gyro 36 output consists of a sequence of incremental attitude angles, and each accelerometer 38 output consists of a sequence of incremental velocities. This operation is typically carried out at a nominal 50-hz iteration rate.

Optimal Filter 32—Since the navigation solution 34, consisting of the inertially derived attitude matrix, velocity vector, and position vector will be degraded over time due to sensor biases and random noise, aiding information must be periodically incorporated to correct the navigation solution 34. The correction applied to the solution 34 is derived using an optimal filtering approach, which utilizes information from position fixes. The optimal filter 32 produces corrections to the PIG attitude matrix, velocity vector, and position vector. This operation is carried out at a nominal iteration interval of 5 to 10 minutes for position measurement processing.

Pipeline Distinctive Feature Correlation 42—The pipeline distinctive feature data (curvature, heading change) can be correlated to the comparable data derived by the inertial navigation system to determine the position error in the inertial solution. The correlation process uses the curvature or heading of the pipeline 12, expressed as functions of the distance traveled from the start of the segment, as measured by an odometer 4 on board the PIG 1, to derive the errors in the inertial system north, east and down position coordinates.

Inertial Navigation Solution

The function of the Navigation Equation Module is to convert the recorded incremental angles and velocities from the inertial sensor triad into a PIG attitude matrix and velocity vector. The navigation solution 34 also requires a set of initial conditions, and a gravity model. In general terms, an inertial navigation system functions by continuously measuring the components of vehicle nongravitational acceleration and angular velocity in three orthogonal sensor reference axes and, simultaneously, integrating the set of differential equations defining vehicle attitude, velocity, and position that have these measurements as inputs. The errors in the navigation system's outputs arise principally from three sources: initial condition errors, errors in the inertial sensor measurements, and errors associated with the assumed earth gravity model.

In the pipeline surveying application, the navigation solution 34 is expressed in a North/East/Down (NED) coordinate frame which is a standard reference frame. The navigation solution 34 is defined by an attitude matrix, that provides the transformation between the sensor reference frame and the NED frame, and a velocity vector. The equations solved in the Navigation Equation Module are the following:

$$\dot{C} = C\{\omega\} - \{\Omega + \rho\}C \quad (1)$$

$$\dot{V} = CA - \{2\Omega + \rho\}V + g \quad (2)$$

where

C=transformation matrix from sensor reference frame to local-vertical NED frame, with initial condition C(0)

V=velocity vector in NED frame, with initial condition V(0)

Ω=angular velocity vector of earth with respect to the inertial frame

ρ=angular velocity of local-vertical frame with respect to the earth reference frame ω=angular velocity vector of sensor reference frame with respect to the inertial frame A=nongravitational acceleration vector of vehicle g=plumb-bob gravity vector and the convention is used here and throughout that a quantity of the form, {v}, denotes the skew-symmetric matrix formed from the components, $v_i$, of the enclosed vector, v.

The navigation solution 34 requires inputs from the earth rate vector, Ω, and the transport rate vector, ρ. The earth rate vector and the transport rate vector are computed by the following equations $$\Omega = \begin{bmatrix} \Omega_n \\ \Omega_e \\ \Omega_d \end{bmatrix} = \begin{bmatrix} \omega_e \cos\lambda \\ 0 \\ -\omega_e \sin\lambda \end{bmatrix} \quad (3)$$

$$\rho = \begin{bmatrix} \rho_n \\ \rho_e \\ \rho_d \end{bmatrix} = \begin{bmatrix} V_e/(\mu_e + h) \\ -V_n/(\mu_n + h) \\ -V_e \tan\lambda/(\mu_e + h) \end{bmatrix} \quad (4)$$

where $V_n$, $V_e$=north and east velocity components, respectively $\Omega_n$, $\Omega_e$, $\Omega_d$=earth-rate components in NED frame $\rho_n$, $\rho_e$, $\rho_d$=transport-rate components in NED frame $\omega_e$=earth's rotation rate relative to an inertial frame of reference λ=geodetic latitude $\mu_n$, $\mu_e$=earth's principal radii of curvature in North and East directions h=altitude The position is defined by latitude, longitude and altitude from the solutions of $$\dot{\lambda} = \frac{V_n}{\mu_n + h} \quad (5)$$

$$\dot{\Lambda} = \frac{-V_e}{(\mu_e + h)\cos\lambda} \quad (6)$$

$$\dot{h} = -V_d \quad (7)$$

where the following definitions apply $V_d$=down velocity component $\Lambda$=longitude The solutions of equations (1) through (7) constitute the 3-dimensional attitude, velocity and position of the PIG 1 as it traverses the pipeline 12. These solutions are sent to a filter 32 and correlator 42 for further processing.

Optimal Filter

The function of the Optimal Filter Module is to process measurements consisting of the difference between quantities derived from the GPS-derived reference points, and the corresponding quantities derived from the navigation solution 34. The Kalman Filter 32 structure is such that all information is blended (i.e., integrated) in an optimal fashion, and is closely related to the more familiar concept of recursive least-squares estimation. The Kalman Filter 32 includes:

A model for the dynamic variations in the state (in the case of interest here, the errors in the inertial navigation solution for attitude and velocity, and position). This takes the form of a set of differential or difference equations A model for the constant and random errors that act as the forcing functions to the dynamic state (in the case of interest here, gyro and accelerometer biases and random-walk errors)

A model for the constant and random errors that appear in the aiding information (in the case of interest here, the errors in the position measurement obtained from the GPS pipeline survey).

The outstanding attribute of the Kalman Filter 32 is that it allows all of the above elements to be accounted for in a very systematic and formalized way, which makes it ideal for implementation in a digital computer. A discussion of steps implicit in the operation of the Kalman Filter 32 follows.

Consider a system whose behavior is defined by the following set of discrete linear equations:

$$X_n = \Phi_n X_{n-1} + B_n \eta_n \quad (8)$$

where

X=vector of states $\eta$=vector of random (zero-mean) noise sequences $\Phi_n$=state transition matrix from $(n-1)^{th}$ to $n^{th}$ update points $B_n$=noise distribution matrix For a given $\Phi$ and B, the state X will have a time variation determined by the particular noise sequence, $\eta$, and initial condition, $X_0$, which in general is taken to be a randomly distributed quantity. Since the noise sequence, $\eta$, has an infinite number of realizations, and the initial condition error can assume an infinite number of values, the system given by (8) has an infinite number of solutions. Because this is true, attention must be focused on the statistical behavior of Equation (8) rather than on specific solutions. The most natural and useful way of characterizing the behavior of (8) is to compute the statistical parameters that define the bounds on the state vector, X The statistical bounds on the components of X are found by solving the covariance matrix equation associated with (8), which takes the recursive form:

$$P_n = \Phi_n P_{n-1} \Phi_n^T + B_n Q_n B_n^T \quad (9)$$

where P is the error covariance matrix of the state vector, X, defined explicitly by:

$$P = [P_{ij}]$$

and $$P_{ij} = E(x_i x_j)$$

in which E denotes the expectation operator. It is seen that the individual variances of the components of X are defined by the diagonal elements of P, with the joint expectations being defined by off-diagonal elements of P. The matrix Q in (9) is the covariance matrix of the driving noise vector, $\eta$, defined by:

$$Q = [q_{ij}]$$

in which $$q_{ij} = E(\eta_i \eta_j)$$

Consider the case where the discrete process defined by (8) represents the true dynamic propagation characteristics associated with a given linear system. For this case, assume that a measurement is made at the $n^{th}$ measurement update time employing an external measuring device which allows a specific linear combination of the states to be directly monitored. A general way of stating this in mathematical terms is as follows:

$$y_n = H_n X + \xi_n \quad (10)$$

where $y_n$=vector of measurements $H_n$=measurement matrix at $n^{th}$ measurement update time $\xi_n$=measurement noise vector applicable to $n^{th}$ measurement and it is assumed that a number of independent measurements become available simultaneously.

The optimal utilization of information introduced through a series of measurements of the form given by (10), to estimate the state vector X in a sequential fashion, is the central problem addressed by Kalman estimation theory, and has the following solution. After each measurement (of a sequence of measurements), the estimate of the state, X, is refreshed by the two-step procedure:

$$\hat{X}_n^- = \Phi_n \hat{X}_{n-1} \quad (11)$$

$$\hat{X}_n = \hat{X}_n^- + K_n[y_n - H_n \hat{X}_n^-] \quad (12)$$

where $\hat{X}_n^-$=optimal estimate of vector X just before the $n^{th}$ measurement is processed $\hat{X}_n$=optimal estimate of vector X immediately after $n^{th}$ measurement is processed $\hat{X}_n$=Kalman gain matrix at nth measurement update with $K_n$ defined by $$K_n = P_n^- H_n^T (H_n P_n^- H^T + R_n)^{-1} \quad (13)$$

in which $P_n^-$=apriori error covariance matrix of vector X $R_n$=measurement noise error covariance matrix and the apriori error covariance matrix, $P_n^-$, is computed from (9) over the interval $t_{n-1}$ to $t_n$.

After processing the nth measurement, the error covariance matrix of the state X is modified to reflect the benefit of incorporating new information introduced by the measurement, by means of:

$$P_n = (I - K_n H_n) P_n^- \qquad (14)$$

where $P_n$ is the aposteriori error covariance matrix. The form given by (14) is applicable when the Kalman Filter is fully optimal; that is, when it is a full-state filter in which all components of X are fully accounted for in the mathematical model and, further, are re-estimated after each successive measurement is made available. The error state for the inertial navigation system consists of 9 elements defining the errors in 3-dimensional attitude, velocity and position.

$$X = (\psi_x, \psi_y, \psi_z, \delta V_x, \delta V_y, \delta V_z, \delta R_x, \delta R_y, \delta R_z)^T \qquad (15)$$

where $\psi_x, \psi_y, \psi_z$=components of attitude error vector in north/east/down frame $\delta V_x, \delta V_y, \delta V_z$=components of velocity error vector in north/east/down frame $\delta R_x, \delta R_y, \delta R_z$=components of position error vector in north/east/down frame In addition, the Kalman Filter 32 may also contain a number of error states associated with the inertial sensors (gyros 36 and accelerometers 38). In the pipeline surveying application of interest, the measurement is of the position errors directly. For the case in which a 2-dimensional position fix is derived from the horizontal characteristics of a distinctive pipeline feature, the H matrix used in the Kalman Filter update is defined by $$H = (0, 0, 0, 0, 0, 0, 1, 1, 0) \qquad (16)$$

and y consists of the position errors at the terminal point of the pipeline segment $$y = \begin{bmatrix} \delta R_x(N) \\ \delta R_y(N) \end{bmatrix} \qquad (17)$$

where $\delta R_x$ and $\delta R_y$ are the derived position errors, and N designates the last GPS-derived point on the pipeline segment 22. The method by which the position errors are made observable is defined in the following discussion.

Pipeline Distinctive Feature Correlation

The correlator 42 correlates the real time measurements with the GPS survey to provide PIG position errors at discrete points 18 along the pipeline 12. Consider the 2-dimensional case in which the pipeline profile is defined in the horizontal plane. The distinctive pipeline segment 22 is defined by a series of points 18 whose positions (latitude, longitude) are precisely known from the GPS survey. This allows two functions to be derived, which define the north (x) and east (y) position coordinates of the pipeline 12 to be expressed in terms of the distance traveled (s) along the arc of the trajectory. This leads to the two relationships for x and y as follows $$x = f(s) \qquad (18)$$

$$y = g(s) \qquad (19)$$

where f and g are known functions derived numerically from the sequence of GPS-derived points 18 defining the pipeline segment 22. The derivatives of x and y with respect to s may then be derived analytically by differentiating the functions f and g or, explicitly $$x'(s) = \frac{df(s)}{ds} \qquad (20)$$

$$y'(s) = \frac{dg(s)}{ds} \qquad (21)$$

The pipeline heading angle may be determined directly from the defining relationship $$\tan\psi = \frac{dy}{dx} \qquad (22)$$

where $\psi$ is the instantaneous pipeline heading angle and dy/dx is, in turn, defined by $$\frac{dy}{dx} = \frac{dy/ds}{dx/ds} = \frac{y'(s)}{x'(s)} \qquad (23)$$

The second derivative of x and y are determined from the relationships $$x''(s) = \frac{d^2 x(s)}{ds^2} \qquad (24)$$

$$y''(s) = \frac{d^2 g(s)}{ds^2} \qquad (25)$$

where the second derivatives of f and g are determined by analytical differentiation of these functions. The second derivative of y with respect to x, which is needed in the determination of pipeline curvature, is derived as follows:

$$y''(s) = \frac{y'(s)}{[x'(s)]^2} \left[ \frac{y''(s)}{y'(s)} - \frac{2x''(s)}{x'(s)} \right] \qquad (26)$$

Then the pipeline curvature is analytically derived from the following relationship $$C(s) = \frac{d^2 y / d x^2}{[1 + (dy/dx)^2]^{3/2}} \qquad (27)$$

The curvature may also be determined directly from the inertial system as follows $$\tilde{C}(s) = \Delta \Phi(s) / \Delta s \qquad (28)$$

where $\tilde{C}(s)$=inertially derived curvature of pipeline as a function of distance traveled along the pipeline $\Delta\Phi(s)$=measured heading angle change over a small segment of the pipeline, as a function of distance traveled along the pipeline $\Delta s$=incremental distance traveled along pipeline measured by the odometer The correlation process begins when the indicated PIG position has reached the point of closest approach to the position associated with the starting point 24 of the distinctive pipeline segment 22. The correlation process derives two components of position error, S and L, as illustrated in FIG. 4, that apply over the pipeline segment 22. The position error component, S, defines the error in the PIG position, as indicated by the inertial navigation solution 34, along the direction of travel, with the position error component, L, being the position error component normal to the direction of travel—the two taken together defining the position error at the starting point of the distinctive pipeline segment 22. Given that the time required to traverse the pipeline segment 22 is short enough, and that the error accumulation during the traversal of this segment 22 is small in comparison to the prior accumulation, the error between the indicated and true positions of the PIG may be characterized by the same two error parameters at all points along the segment. The error parameter, S, is determined by a correlation process that utilizes least-squares to establish the value of the parameter that minimizes the criterion function, J, defined by $$J = \sum_{i=0}^{N} \left[ \tilde{C}(s) - C(s) - \frac{\partial C(s)}{\partial s} S \right]^2 \quad (29)$$

where $\partial C/\partial S$ is the partial derivative of the analytically derived curvature function, as defined by (27), and N is the, number of GPS-surveyed points 18 in the pipeline segment 22. Taking the partial derivative of the criterion function with respect to the position error parameter, S, results in $$\frac{\partial J}{\partial S} = 2\sum_{i=0}^{N} \left[ \tilde{C}(s) - C(s) - \frac{\partial C(s)}{\partial s} S \right] \frac{\partial C(s)}{\partial s} = 0$$

which leads to the optimizing value of S given by $$S = \frac{\sum_{i=0}^{N} [\tilde{C}(s) - C(s)] \frac{\partial C(s)}{\partial s}}{\sum_{i=0}^{N} \left[ \frac{\partial C(s)}{\partial s} \right]^2} \quad (30)$$

It is also possible to base the determination of S on a comparison of heading angle changes as determined from the GPS survey data and that indicated by the inertial system. The analogous criterion function is as follows $$J = \sum_{i=0}^{N} \left[ \tilde{\psi}(s) - \psi(s) - \frac{\partial \psi(s)}{\partial s} S \right]^2 \quad (31)$$

where $\tilde{\Phi}(s)$ is the pipeline heading angle as determined by the inertial navigation system, and $\Phi(s)$ is the same angle determined from the series of GPS-derived pipeline coordinates. The optimizing value of S is found from the condition $$\frac{\partial J}{\partial S} = 2\sum_{i=0}^{N} \left[ \tilde{\psi}(s) - \psi(s) - \frac{\partial \psi(s)}{\partial s} S \right] \frac{\partial \psi(s)}{\partial s} = 0$$

which leads to the following expression for S $$S = \frac{\sum_{i=0}^{N} [\tilde{\psi}(s) - \psi(s)] \partial \psi \frac{(s)}{\partial s}}{\sum_{i=0}^{N} \left[ \frac{\partial \psi(s)}{\partial s} \right]^2} \quad (32)$$

Once having determined the optimizing values of S the inertial system position coordinates are adjusted by means of the following equations, in which $\tilde{x}_i$ and $\tilde{y}_i$ are the north and east position coordinates at the $i^{th}$ point on the distinctive pipeline segment $$\tilde{x}_i = \tilde{x}_i - S \cos \psi_i \cos \theta_i \quad (33)$$

$$\tilde{y}_i = \tilde{y}_i - S \sin \psi_i \cos \theta_i \quad (34)$$

Coordinates $\tilde{x}_i$ and $\tilde{y}_i$ are determined from numerical integration as follows:

$$x_i = x_0 + \sum_{j=1}^{M} \Delta s(jT) \cos \psi(jT) \cos \theta(jT) \quad (35)$$

$$y_i = y_0 + \sum_{j=1}^{M} \Delta s(jT) \sin \psi(jT) \cos \theta(jT) \quad (36)$$

in which $\theta$ and $\psi$ are the PIG pitch and heading angle, respectively, as derived from the inertial navigation solution 34; $\Delta s$ is the incremental distance traveled, as measured by the odometer 40; T is the computational iteration interval (on the order of $\frac{1}{50}$ sec); j is the iteration designator; and M is the number of iterations which occur in reaching the $i^{th}$ point on the distinctive pipeline segment 22.

From (35) and (36) it is clear that, if the errors in the inertially derived pitch and heading angle, and the error in the odometer-derived incremental distance measurements are small, the accumulation of position error over the integration period associated with the distinctive pipeline segment 22 will be small in comparison to the errors in the initial north and east position coordinates, $x_0$ and $y_0$. Therefore, as a good approximation, the north and east position errors at all points along the distinctive pipeline segment 22 can be taken to be the same as those at the start point 24 (that is, $\tilde{x}_k - x_k = \tilde{x}_0 - x_0$ and $\tilde{y}_k - y_k = \tilde{y}_0 - y_0$). Also, because the position errors in the direction along the pipeline 12 have been accounted for at this point in the correlation process, via (33) and (34), the common error at all points along the pipeline segment 22 will be in a direction normal to the pipeline 12 at the start of the distinctive pipeline segment 24. The component of position error, L, normal to the pipeline 12 at the start point 24 is found by defining a suitable criterion function to be minimized. The criterion function is chosen as the sum of squares of the differences between the indicated and GPS-derived positions, as measured in the direction defined by the normal to pipeline 12 at the start point 24. In this step, the position errors are ascribed to the single error parameter, L, which is the position error in a direction normal to the direction of travel at the start point 24 of the correlation process, after the adjustment inherent in (33) and (34). The criterion function is defined by $$J = \sum_{i=0}^{N} [(\tilde{x}_i - x_i - La_0)^2 + (\tilde{y}_i - y_i - Lb_0)^2] \quad (37)$$

where $a_0$ and $b_0$ are the direction cosines of the normal to the pipeline 12 at the first point in the pipeline distinctive-feature segment 22 where the angle $\beta$ is the heading angle of the normal to the trajectory. $a_0$ and $b_0$ are explicitly defined by $$a_0 = \cos \beta_0 \quad (38)$$

$$b_0 = \sin \beta_0 \quad (39)$$

$\beta$ is related to the heading angle of the unit vector along the direction of travel by $$\sin \beta = \sin(\psi + \pi/2) = \cos \psi \quad (40)$$

$$\cos \beta = \cos(\psi + \pi/2) = -\sin \psi \quad (41)$$

in which $\psi$ is defined by (22). The optimizing value of the normal component of the position error parameter, L, is found by taking the partial derivative of the criterion function with respect to this parameter, and then setting to zero yields $$\frac{\partial J}{\partial L} = 2 \sum_{i=0}^{N} [(\tilde{x}_i - x_i - La_0)a_0 + (\tilde{y}_i - y_i - Lb_0)b_0] = 0$$

which then leads to the value of L given by $$L = \frac{1}{N} \sum_{i=0}^{N} [(\tilde{x}_i - x_i)a_0 + (\tilde{y}_i - y_i)b_0] \quad (42)$$

The two-step correlation procedure may be iterated a second time to essentially eliminate nonlinear effects associated with large position errors. Having done this, and thus having arrived at the optimal values of the two position error parameters S and L, the north and east position error components of the $N^{th}$ point on the indicated trajectory can be found using the following relationships $$\delta R_x(N) = S \cos \psi_N - L \sin \psi_0 \quad (43)$$

$$\delta R_y(N) = S \sin \psi_N + L \cos \psi_0 \quad (44)$$

where $\delta R_x(N), \delta R_y(N)$=position error estimates (north, east) at the last ($N^{th}$) point on the pipeline segment $\psi_0$=heading angle of the pipeline at the start point on the pipeline segment $\psi_N$=heading angle of the pipeline at the end ($N^{th}$) point on the pipeline segment The Kalman Filter 32 utilizes both position error measurements defined by (43) and (44) to update the inertial navigation solution 34, as illustrated in FIG. 3 to provide the navigation solution 34 with accurate values to determine the best determination of attitude, velocity and position.

The invention has been described herein in detail in order to comply with the Patent Statutes and to provide those skilled in the art with the information needed to apply the novel principles and to construct and use such specialized processes and components as are required. However, it is to be understood that the invention can be carried out by specifically different processes and components, and that various modifications, both as to the processing details and operating procedures, can be accomplished without departing from the scope of the invention itself.

What is claimed is:

1. A pipeline surveying system comprising:

a pipeline pig;

an inertial measurement unit (IMU) located in the pipeline pig, the IMU for providing at least one inertial-measurement output;

at least one processor;

data storage;

a datafile stored on the data storage, the datafile containing reference-pipeline-characteristic data defining at least one distinctive-pipeline-reference feature; and programmable instructions executable by the processor to:

calculate the pipeline pig attitude, velocity, and position data based on the at least one inertial-measurement output of the IMU;

generate at least one distinctive-pipeline-measured feature using the at least one inertial-measurement output;

correlate the at least one distinctive-pipeline-reference feature with the at least one distinctive-pipeline-measured feature to produce at least one estimated-pig-location error; and a filter for providing the at least one estimated-pig-location error to provide at least one corrected-inertial-measurement output.

2. The pipeline surveying system of claim 1, wherein the programmable instructions to generate at least one distinctive-pipeline-measured feature comprises programmable instructions to generate at least one navigation-solution parameter; and further comprising:

programmable instructions executable by the processor to correct the at least one navigation-solution parameter using the at least one corrected-inertial-measurement output.

3. The pipeline surveying system of claim 2, wherein the at least one distinctive-pipeline-reference feature comprises a surveyed-geometric profile of a section of pipeline, wherein the at least one distinctive-pipeline-measured feature comprises a measured-geometric profile representative of the section of pipeline, and wherein the programmable instructions executable by the processor to correlate the at least one distinctive-pipeline-reference feature with the at least one distinctive-pipeline-measured feature comprise programmable instructions to:

detect the at least one distinctive-pipeline-reference feature by iteratively comparing the measured-geometric profile against the surveyed-geometric profile.

4. The pipeline surveying system of claim 2, wherein the at least one distinctive-pipeline-reference feature comprises a surveyed curvature of a section of pipeline, wherein the at least one distinctive-pipeline-measured feature comprises a measured curvature of the section of pipeline, and wherein the programmable instructions executable by the processor to correlate the at least one distinctive-pipeline-reference feature with the at least one distinctive-pipeline-measured feature comprises programmable instructions to:

detect the at least one distinctive-pipeline-reference feature by iteratively comparing the measured curvature against the surveyed curvature.

5. The pipeline surveying system of claim 2, wherein the at least one distinctive-pipeline-reference feature comprises a surveyed heading of a section of pipeline, wherein each of the at least one distinctive-pipeline-measured feature comprises a measured heading of the section of pipeline, and wherein the programmable instructions executable by the processor to correlate the at least one distinctive-pipeline-reference feature with the at least one distinctive-pipeline-measured feature comprises programmable instructions to:

detect the at least one distinctive-pipeline-reference feature by iteratively comparing the measured heading against the surveyed heading.

6. The pipeline surveying system of claim 2, wherein the at least one distinctive-pipeline-reference feature comprises a surveyed curvature and a surveyed heading of a section of pipeline, wherein each of the at least one distinctive-pipeline-measured feature comprises a measured curvature and a measured heading of the section of pipeline, and wherein the programmable instructions executable by the processor to correlate the at least one distinctive-pipeline-reference feature with the at least one distinctive-pipeline-measured feature comprises programmable instructions to:

detect the at least one distinctive-pipeline-reference feature by iteratively comparing the measured curvature and measured heading against the surveyed curvature and surveyed heading, respectively.

7. The pipeline surveying system of claim 2, wherein the at least one processor, the data storage, the datafile, and the programmable instruction are in communication with the pipeline pig, and wherein the at least one corrected inertial-measurement output is provided in real-time.

8. The pipeline surveying system of claim 1, wherein each of the at least one distinctive-pipeline-reference feature comprises a surveyed-geometric profile of a section of the pipeline.

9. The pipeline surveying system of claim 8, wherein the surveyed-geometric profile comprises a longitude coordinate, a latitude coordinate, and an attitude coordinate.

10. The pipeline surveying system of claim 8, wherein the surveyed-geometric profile of the pipeline comprises a curvature of at least one section of the pipeline.

11. The pipeline surveying system of claim 8, wherein the surveyed-geometric profile of the pipeline comprises a heading of at least one section of the pipeline.

12. The pipeline surveying system of claim 11, wherein the surveyed-geometric profile of the pipeline further comprises a curvature of at least one section of the pipeline.

13. The pipeline surveying system of claim 8, wherein the surveyed-geometric profile is generated from pre-processing-pipeline-survey data.

14. The pipeline surveying system of claim 13, wherein the pre-processing-pipeline-survey data is provided by a map selected from the group consisting of a surveyor's map, a pig-and-sensor-generated-coordinate-based-pipeline map, a Global-Position-Sensor-time-correlated-radar map, a Global-Position-Sensor-time-correlated-sonar map, and other pipeline mapping technique.

15. The pipeline surveying system of claim 1, wherein the programmable instructions executable by the processor to generate at least one distinctive-pipeline-measured feature comprise programmable instructions executable by the processor to:

generate an attitude matrix as a function of the at least one inertial-measurement output;

generate a velocity vector as a function of the at least one inertial-measurement output; and generate a measured-geometric profile representative of a curvature of a section of pipeline as a function of the attitude matrix and the velocity vector.

16. The pipeline surveying system of claim 1, wherein the programmable instructions executable by the processor to generate at least one distinctive-pipeline-measured feature comprise programmable instructions executable by the processor to:

generate an attitude matrix as a function of the at least one inertial-measurement output;

generate a velocity vector as a function of the at least one inertial-measurement output; and generate a measured-geometric profile representative of a heading of a section of pipeline as a function of the attitude matrix and the velocity vector.

17. The pipeline surveying system of claim 1, wherein the programmable instructions executable by the processor to generate at least one distinctive-pipeline-measured feature comprise programmable instructions executable by the processor to:

generate an attitude matrix as a function of the at least one inertial-measurement output;

generate a velocity vector as a function of the at least one inertial-measurement output; and generate a measured-geometric profile representative of a curvature and a heading of a section of pipeline as a function of the attitude matrix and the velocity vector.

18. The pipeline surveying system of claim 1, wherein the programmable instructions executable by the processor to generate at least one distinctive-pipeline-measured feature comprise programmable instructions executable by the processor to:

generate an attitude matrix as a function of the at least one inertial-measurement output;

generate a velocity vector as a function of the at least one inertial-measurement output;

generate a position vector as a function of the at least one inertial-measurement output; and generate a measured-geometric profile representative of a curvature and heading of a section of pipeline as a function of the attitude matrix, the velocity vector, and the position vector.

19. The pipeline surveying system of claim 1, further including an odometer apparatus for providing a pig-distance-traveled output, wherein the programmable instructions executable by the processor to generate at least one distinctive-pipeline-measured feature comprise programmable instructions executable by the processor to:

generate an attitude matrix as a function of the at least one inertial-measurement output;

generate a velocity vector as a function of the at least one inertial-measurement output;

generate a position vector as a function of the at least one inertial-measurement output; and generate a measured-geometric profile representative of a curvature and heading of a section of pipeline as a function of the attitude matrix, the velocity vector, the position vector, and the pig-distance-traveled output.

20. The pipeline surveying system of claim 19, wherein the measured-geometric profile comprises a longitude coordinate, a latitude coordinate, and an attitude coordinate.

* * * * *

UNITED STATES PATENT AND TRADEMARK OFFICE
CERTIFICATE OF CORRECTION

PATENT NO.    : 6,553,322 B1
DATED         : April 22, 2003
INVENTOR(S)   : Ignagni It is certified that error appears in the above-identified patent and that said Letters Patent is hereby corrected as shown below:

Title page,
Item [57], ABSTRACT,
Line 3, please delete "determine" and substitute -- determined --.

Column 2,
Line 59, start a new paragraph at the word "During".

Column 5,
Line 20, start a new paragraph between the words "phase" and "The".

Column 8,
Equation 11, delete "$\hat{X}_n^{-=\Phi}{}_n\hat{X}_{n-1}$," and substitute -- $\hat{X}_n^- = \Phi_n \hat{X}_{n-1}$ --.

Column 8,
Equation 12, delete "$\hat{X}_n = \hat{X}_n^- + K_n[y_n - H_n \hat{X}_n^{-1}]$" and substitute with
-- $\hat{X}_n = \hat{X}_n^- + K_n[y_n - H_n \hat{X}_n^-]$ --.

Line 62, delete "$\hat{X}_{-n}$" and substitute with -- $\hat{X}_n$ --.

Line 65, delete "$\hat{X}_n$" and substitute with -- $K_n$ --.

Line 13, delete "$K_n = P_n^- H_n^T (H_n P_n^{31} H^{nT} + R_n)^{-1}$" replace with
-- $K_n = P_n^- H_n^T (H_n P^- H_n^T + R_n)^{-1}$ --.

Column 10,
Equation 28, delete "$\tilde{C}(s) = \Delta\Phi(s)/\Delta s$" and substitute with -- $\tilde{C}(s) = \Delta\psi(s)/\Delta s$ --.

Line 58, delete "$\Delta\Phi(s)$," and substitute with -- $\Delta\psi(s)$ --.

Column 11,
Line 59, delete "$\Delta\Phi(s)$," and substitute with -- $\Delta\psi(s)$ --.

UNITED STATES PATENT AND TRADEMARK OFFICE
CERTIFICATE OF CORRECTION

PATENT NO. : 6,553,322 B1
DATED : April 22, 2003
INVENTOR(S) : Ignagni

It is certified that error appears in the above-identified patent and that said Letters Patent is hereby corrected as shown below:

Column 12,

Equation 32, delete "$S = \dfrac{\sum_{i=0}^{N}[\tilde{\psi}(s) - \psi(s)]\partial\psi\dfrac{(s)}{\partial s}}{\sum_{i=0}^{N}\left[\dfrac{\partial\psi(s)}{\partial s}\right]^2}$," and substitute with -- $S = \dfrac{\sum_{i=0}^{N}[\tilde{\psi}(s) - \psi(s)]\dfrac{\partial\psi(s)}{\partial s}}{\sum_{i=0}^{N}\left[\dfrac{\partial\psi(s)}{\partial s}\right]^2}$ --.

Line 10, add a comma after "S".

Column 13,
Lines 8 and 11, delete "$\alpha_o$ and substitute with -- $a_o$ --.

Equation 38, delete "$\alpha_o = \cos\beta_0$" and substitute with -- $a_o = \cos\beta_0$ --.

Signed and Sealed this

Nineteenth Day of October, 2004

JON W. DUDAS
*Director of the United States Patent and Trademark Office*